(12) United States Patent
Yanagi (10) Patent No.: US 9,490,460 B2
(45) Date of Patent: Nov. 8, 2016

(54) BATTERY PACK OF VEHICLE

(71) Applicant: MITSUBISHI JIDOSHA KOGYO KABUSHIKI KAISHA, Tokyo (JP)

(72) Inventor: Kenji Yanagi, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 126 days.

(21) Appl. No.: 13/940,368

(22) Filed: Jul. 12, 2013

(65) Prior Publication Data

US 2014/0017546 A1  Jan. 16, 2014

(30) Foreign Application Priority Data

Jul. 13, 2012  (JP) .................. 2012-157230

(51) Int. Cl.
| | | |
|---|---|---|
| *H01M 10/50* | (2006.01) | |
| *H01M 2/10* | (2006.01) | |
| *H01M 10/625* | (2014.01) | |
| *H01M 10/6563* | (2014.01) | |
| *H01M 10/613* | (2014.01) | |
| *H01M 2/20* | (2006.01) | |
| *H01M 10/663* | (2014.01) | |

(52) U.S. Cl.
CPC ......... *H01M 2/1083* (2013.01); *H01M 2/1077* (2013.01); *H01M 10/613* (2015.04); *H01M 10/625* (2015.04); *H01M 10/6563* (2015.04); *H01M 2/206* (2013.01); *H01M 10/663* (2015.04); *H01M 2220/20* (2013.01)

(58) Field of Classification Search
CPC ........... H01M 2/1083; H01M 2/1077; H01M 10/5004; H01M 10/5016; H01M 10/5067; H01M 2/206; H01M 10/5095; H01M 2220/20

USPC .......................................... 429/120
See application file for complete search history.

(56) References Cited

U.S. PATENT DOCUMENTS

| | | | |
|---|---|---|---|
| 6,472,098 B1* | 10/2002 | Sawada et al. ............... 429/163 |
| 2010/0270976 A1* | 10/2010 | Tamura ................... B60L 11/14 | 320/136 |
| 2011/0068622 A1 | 3/2011 | Ikeno et al. |
| 2012/0018238 A1 | 1/2012 | Mizoguchi et al. |
| 2013/0149576 A1* | 6/2013 | Lee et al. .......................... 429/83 |
| 2013/0241493 A1 | 9/2013 | Kosaki et al. |

FOREIGN PATENT DOCUMENTS

| | | | |
|---|---|---|---|
| CN | 102448758 A | 5/2012 | |
| JP | 2001-6643 A | 1/2001 | |
| JP | 2009-099490 | * 10/2007 | .............. H01M 2/10 |

(Continued)

*Primary Examiner* — Gary Harris
(74) *Attorney, Agent, or Firm* — Birch, Stewart, Kolasch & Birch, LLP (57) ABSTRACT

A battery pack includes: a battery; a battery case including: a battery tray which contains the battery; and a battery cover which is mounted on the battery tray; a cooling unit provided in an end part of the battery case in a first direction that is a longitudinal direction of the battery case, and supplying a cooling air into the battery case; an air flow passage provided above the battery and extending along the first direction, in a center part in a second direction perpendicular to the first direction inside the battery case, one end of the air flow passage connected to the cooling unit; and an electric cable arranged between the air flow passage and the battery cover, along the first direction, and supplying an electric power of the battery to a motor.

7 Claims, 5 Drawing Sheets

(56) References Cited

FOREIGN PATENT DOCUMENTS

| | | |
|---|---|---|
| JP | 2008-140631 A | 6/2008 |
| JP | 2009-99490 A | 5/2009 |
| JP | 2011-68187 A | 4/2011 |
| JP | 2011-116321 A | 6/2011 |
| JP | 2012-54052 A | 3/2012 |
| WO | WO 2006/059469 A1 | 6/2006 |
| WO | WO 2012/028927 A2 | 3/2012 |

* cited by examiner

BATTERY PACK OF VEHICLE

CROSS-REFERENCE TO RELATED APPLICATION(S)

This application is based upon and claims the benefit of priority from prior Japanese patent application No. 2012-157230, filed on Jul. 13, 2012, the entire contents of which are incorporated herein by reference.

BACKGROUND

The present invention relates to a battery pack of a vehicle which contains a battery for driving the vehicle, and more particularly, to the battery pack which is mounted on a vehicle such as an electric vehicle and a hybrid vehicle.

A battery pack which is mounted on a vehicle such as an electric vehicle and a hybrid vehicle is provided with a battery including a plurality of battery cells, and a battery case for containing the battery.

The battery pack is attached to a lower face of a floor panel of the vehicle. Because an upper face of the floor panel forms a part of a vehicle room, the battery pack is disposed outside of the vehicle room.

An electric power of the battery is supplied to a driving motor by way of an electric cable which connects the battery to the driving motor. By actuating the driving motor, wheels are rotated thereby to drive the vehicle.

In JP-A-2011-68187, for example, there is disclosed a hybrid vehicle which is provided with a battery pack having a cooling unit, a driving motor which is actuated by an electric power of the battery pack, an inverter for controlling the driving motor, an electric cable for connecting the battery pack to the inverter, and an engine.

This battery pack of the hybrid vehicle is installed in a baggage room in a rear part of the vehicle. On the other hand, the inverter and the driving motor are installed in a front part of the vehicle, and the diving motor is connected to front wheels. For this reason, the electric cable is arranged along a vehicle anteroposterior direction of the vehicle, in a center part of the vehicle in a vehicle width direction, in a state covered with a cover member.

The battery pack is provided with an air cooling fan, and a duct for feeding a cooling air which is supplied from the air cooling fan, to the battery. The duct is disposed in parallel with the electric cable, passing inside the cover member.

By the way, in case of the vehicle of four-wheel drive, it is necessary to arrange the electric cable from the battery pack respectively toward the front wheels and the rear wheels.

For example, in case where the battery pack disclosed in JP-A-2011-116321 is attached to the floor panel of the vehicle, it is necessary to withdraw two electric cables from a front end of the battery pack, so that one of the two electric cables may be arranged toward the front wheels, and at the same time, the other electric cable may be arranged toward the rear wheels. In case where the electric cable to be arranged toward the rear wheels is disposed at a lateral side of the battery pack, that is, in an end part of the vehicle in the vehicle width direction, there is such anxiety that the electric cable may be damaged due to splash of stones, attack of strange matters while the vehicle is running, or deformation of a vehicle body with an external force from a lateral side of the vehicle, and so on. Therefore, considering safety, the electric cable is disposed in the center part of the vehicle in the vehicle width direction, by passing it through the battery case of the battery pack.

On occasion of disposing the electric cable in the battery case, the electric cable is fixed to the battery case or the like with fixing clips, for the purpose of preventing movements of the electric cable (hereinafter referred to as "flappering") due to vibration of the vehicle, which may damage surrounding members. After both ends of the electric cable are respectively connected to objects to be connected, the electric cable is fixed to a predetermined position which has been set in advance by layout or so.

However, in some cases, the electric cable has a longer length than a length which has been determined according to the layout or so, since there is a large tolerance in the length of the electric cable in a longitudinal direction. In such a case, even though a worker tries to fix the electric cable to the predetermined position inside the battery case with the fixing clips, after the both ends of the electric cable have been respectively connected to the objects to be connected, it is sometimes impossible to arrange the electric cable at a predetermined wiring position, since the electric cable is too long. As the results, the electric cable is unable to be fixed to the predetermined position with the fixing clip, in some cases.

SUMMARY

The presently disclosed subject matter may provide a battery pack of a vehicle which can stably support an electric cable, by absorbing a superfluous length of the electric cable.

The battery pack of a vehicle may comprise: a battery; a battery case including: a battery tray which contains the battery; and a battery cover which is mounted on the battery tray and which covers the battery; a cooling unit provided in an end part of the battery case in a first direction that is a longitudinal direction of the battery case, and configured to supply a cooling air into the battery case; an air flow passage provided above the battery and extending along the first direction, in a center part in a second direction perpendicular to the first direction inside the battery case, one end of the air flow passage connected to the cooling unit; and an electric cable arranged between the air flow passage and the battery cover, along the first direction, and configured to supply an electric power of the battery to a motor.

A concave part in a shape of a groove may be formed on an upper face of an upper wall of the air flow passage along the first direction, and the electric cable may be arranged in the concave part.

The concave part of the air flow passage may have a width capable of absorbing a superfluous length of the electric cable when both ends of the electric cable are respectively connected to objects to be connected.

The electric cable may include a positive side cable and a negative side cable, the concave part of the air flow passage may include two recesses which are different from each other in depth, and the positive side cable and the negative side cable may be respectively arranged in the two recesses.

A floor panel of the vehicle may be provided with a floor tunnel which is protruded upward and which extends along a vehicle anteroposterior direction, in a center part of the floor panel in a vehicle width direction, the battery cover may have a convex part which is protruded upward and which extends along the first direction, in the center part in the second direction, and the air flow passage and the electric cable may be arranged in the convex part, and the convex part may be provided inside the floor tunnel.

An elastic material may be provided between the electric cable and the battery cover, and the electric cable may be pressed with the elastic material against the air flow passage.

The battery may include a plurality of batteries, and bus bars for connecting the batteries may include a bus bar which is disposed in the center part in the second direction and which is arranged between a lower face of the air flow passage and upper faces of the batteries.

DETAILED DESCRIPTION OF EXEMPLARY EMBODIMENTS

Now, a battery pack of a vehicle according to the invention will be described in detail, referring to the drawings. It is to be noted that sizes, materials, shapes of constituent components which are described in the following embodiments, and relative arrangement of the constituent components do not limit a scope of the invention, but only exemplifies this invention, unless particularly described. Moreover, in the following embodiments, a case where the invention is applied to a vehicle of four-wheel drive will be described, but the invention is not limited to the case. The invention can be also applied to a vehicle of front-wheel drive or rear-wheel drive.

First Embodiment

Figure 1:
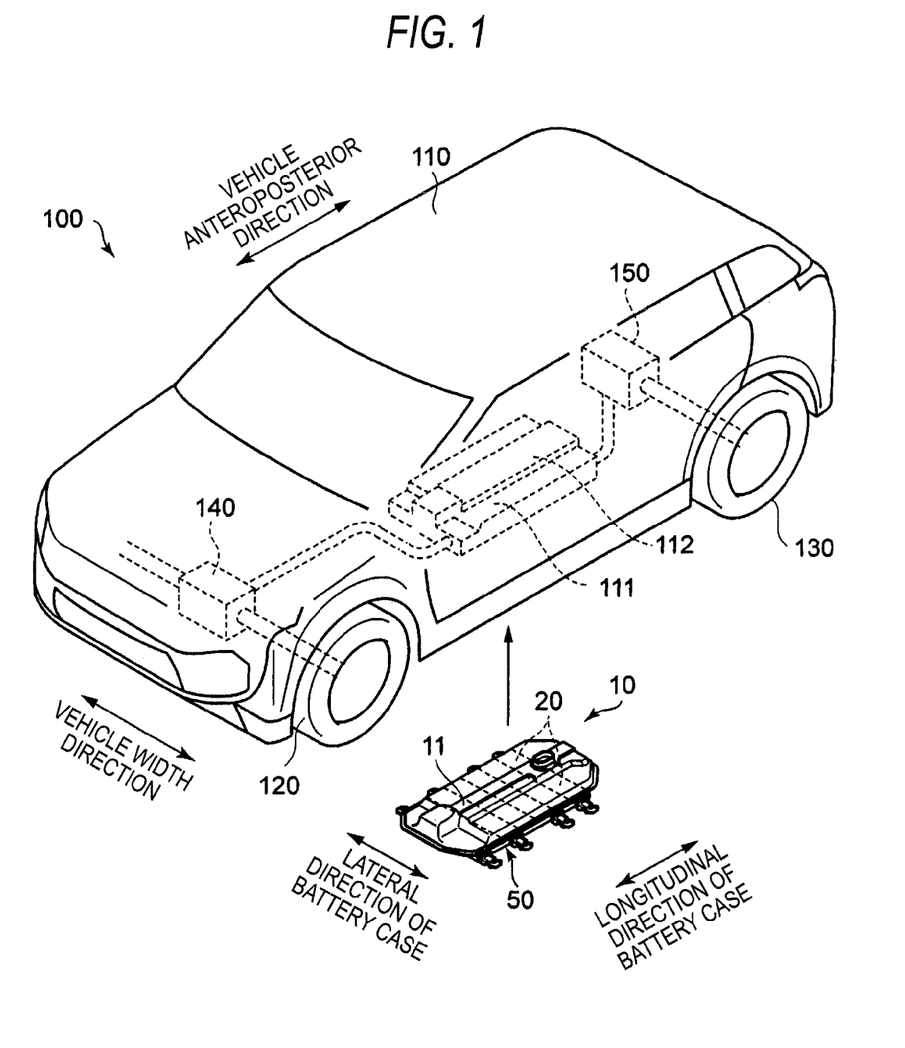
FIG. 1 is a perspective view schematically showing structure of a vehicle which is provided with a battery pack in a first embodiment according to the invention.

FIG. 1 is a perspective view schematically showing structure of a vehicle which is provided with a battery pack in a first embodiment according to the invention.

As shown in FIG. 1, a vehicle 100 has a floor panel 111 in a lower part of a vehicle body 110, and a battery pack 10 is attached to a lower face of the floor panel 111. An upper face of the floor panel 111 forms a part of a vehicle room, and therefore, the battery pack 10 is disposed outside of the vehicle room.

The battery pack 10 has batteries 20, and a battery case 50 for containing the batteries 20. The battery pack 10 is disposed in such a manner that a longer side (a longitudinal direction) of the battery case 50 is aligned with a vehicle anteroposterior direction of the vehicle 100, and a shorter side (a lateral direction perpendicular to the longitudinal direction) of the battery case 50 is aligned with a vehicle width direction of the vehicle 100. In the following description, the longitudinal direction of the battery case 50 is referred to as the vehicle anteroposterior direction of the vehicle 100, and the lateral direction of the battery case 50 is referred to as the vehicle width direction of the vehicle 100.

As the vehicle 100 on which the battery pack 10 is mounted, there are a hybrid vehicle and an electric vehicle.

The battery pack 10 is connected to a front wheel driving motor 140 and a rear wheel driving motor 150 for rotating front wheels 120 and rear wheels 130 respectively. Each of the motors 140, 150 receive an output of the battery pack 10 to generate motor energy for driving the vehicle 100. Outputs of the motors 140, 150 are respectively transmitted to the front wheels 120 and the rear wheels 130.

Figure 2:
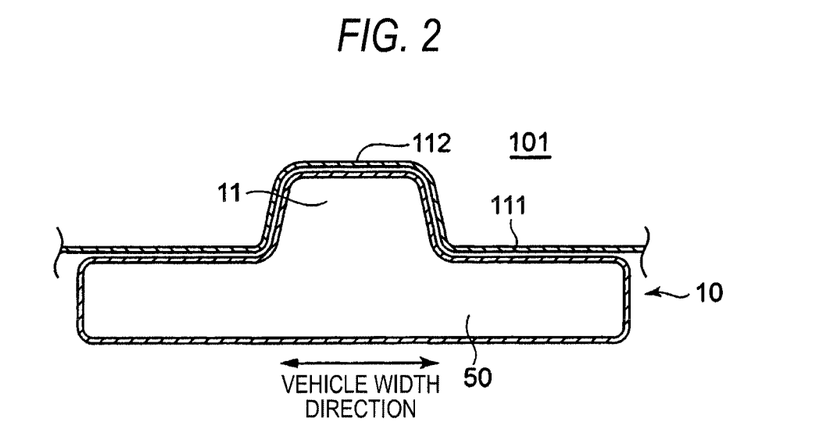
FIG. 2 is a schematic sectional view of the battery pack in the first embodiment according to the invention and a floor panel, as seen from a front side of the vehicle.

FIG. 2 is a schematic sectional view of the battery pack 10 in the first embodiment according to the invention, and the floor panel 111, as seen from a front side of the vehicle 100.

As shown in FIG. 2, the floor panel 111 has a floor tunnel 112 which is protruded upward and which extends along the vehicle anteroposterior direction, in a center part of the floor panel 111 in the vehicle width direction. The floor tunnel 112 is provided between a driver's seat and an assistant driver's seat in the vehicle width direction.

A convex part 11 of the battery pack 10 is positioned inside the floor tunnel 112. Structure of the battery pack 10 will be described below.

Figure 3:
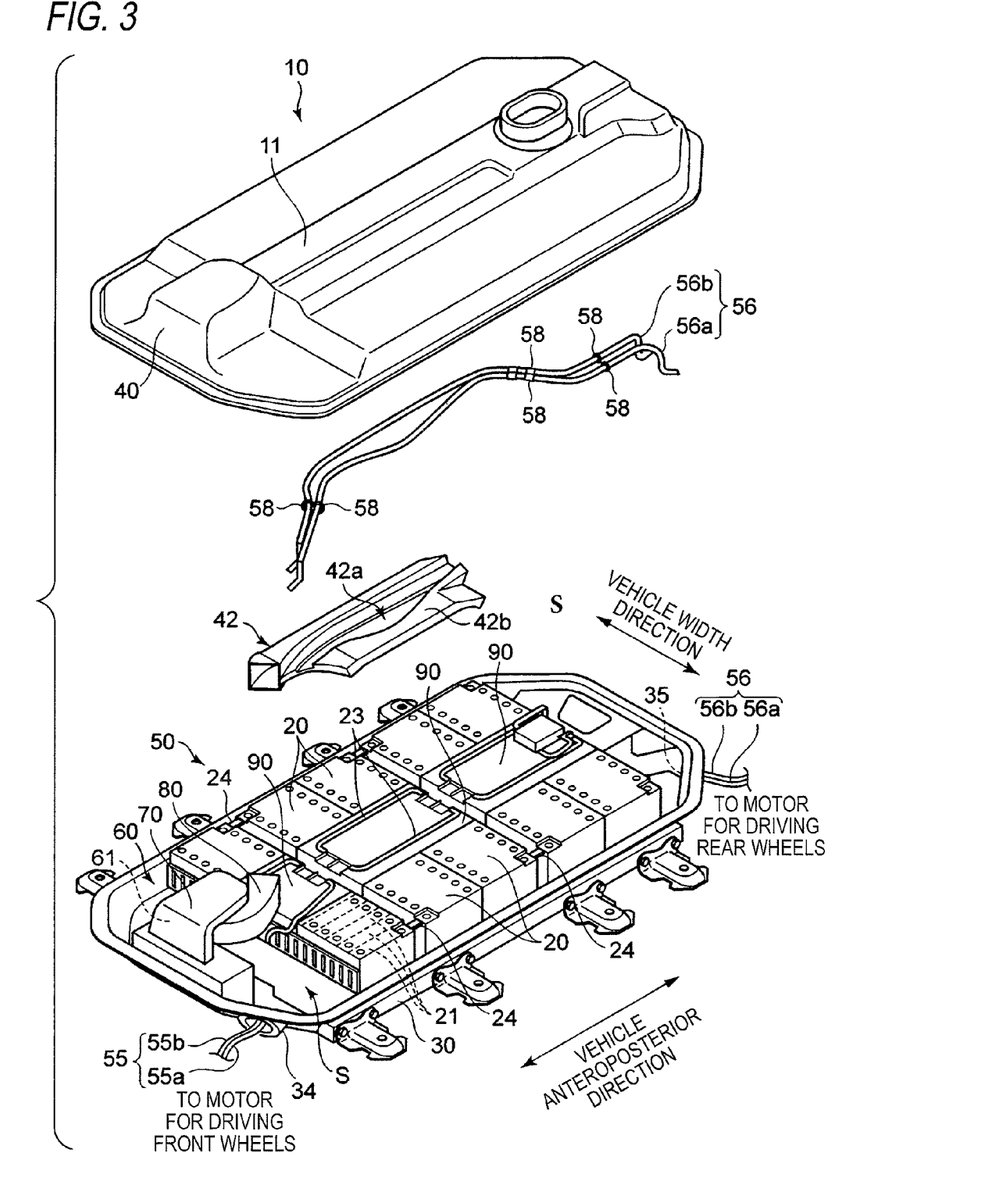
FIG. 3 is an exploded perspective view of the battery pack in the first embodiment according to the invention.
Figure 4:
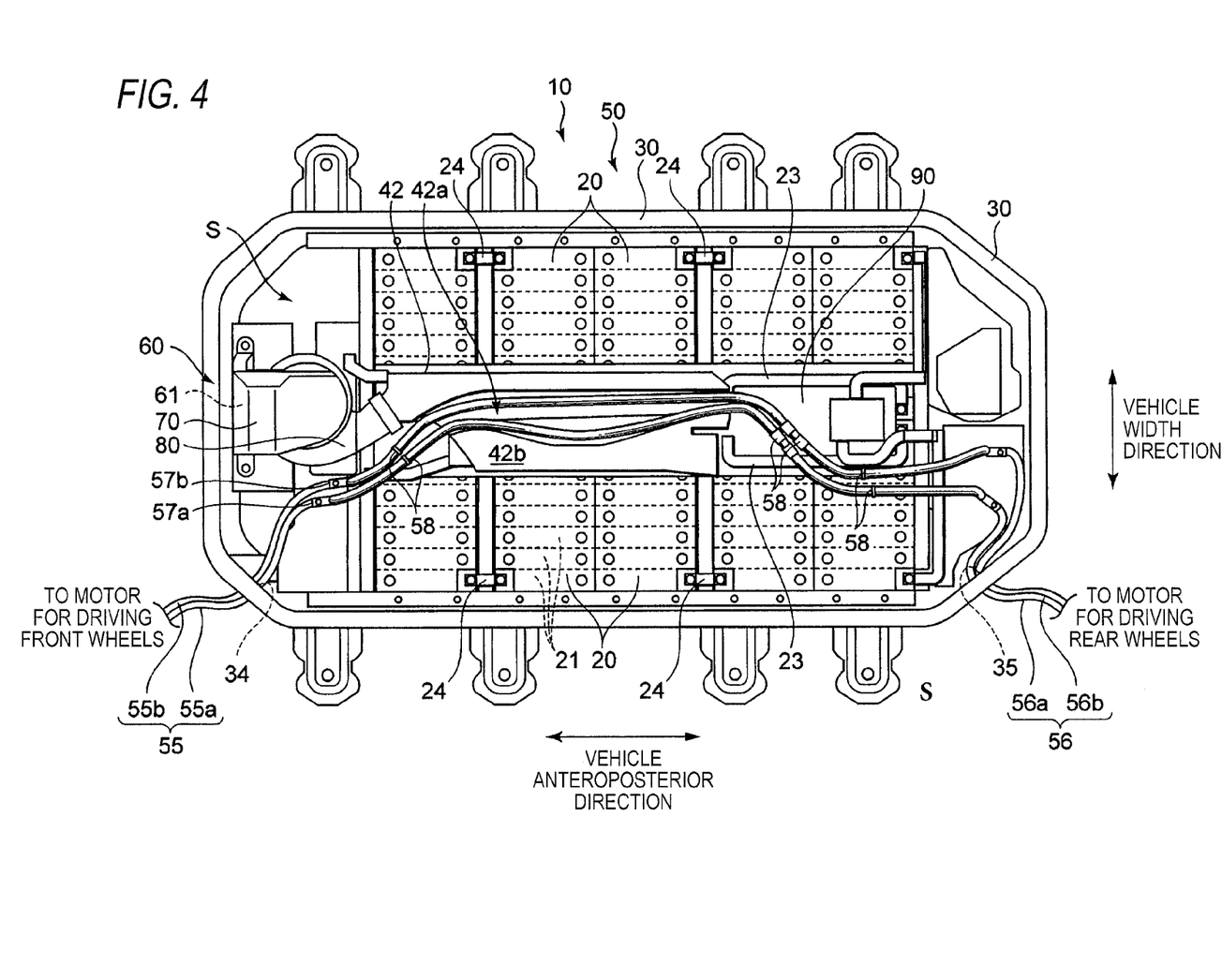
FIG. 4 is a plan view of the battery pack in the first embodiment according to the invention, in a state where a battery cover is removed.

FIG. 3 is an exploded perspective view of the battery pack 10 in the first embodiment according to the invention, and FIG. 4 is a plan view of the battery pack 10 in the first embodiment according to the invention, in a state where a battery cover is removed.

As shown in FIGS. 3 and 4, the battery pack 10 is provided with a plurality of batteries 20, the battery case 50, and a cooling unit 60 for supplying a cooling air into the battery case 50.

The battery case 50 includes a battery tray 30 which constitutes a lower part of the battery case 50, and a battery cover 40 which constitutes an upper part of the battery case 50.

A plurality of the batteries 20 are contained in a space which is formed between the battery tray 30 and the battery cover 40. In this embodiment, two pieces of the batteries 20 are arranged in the vehicle width direction, and five pieces of the batteries 20 are arranged in the vehicle anteroposterior direction.

Each of the batteries 20 includes a plurality of battery cells 21. In this embodiment, each of the batteries 20 includes eight pieces of the battery cells 21, but the number of the battery cells 21 is not limited to eight.

The batteries 20 are fixed to the battery tray 30 by means of battery holders 90.

The two batteries 20 which are adjacent to each other in the vehicle anteroposterior direction are interconnected by bus bars 23, 24.

The bus bars 23 are disposed along the vehicle anteroposterior direction, in a center part of the battery case 50 in the vehicle width direction. Each of the bus bars 23 has a substantially U-shape, and disposed on the two batteries 20 so as to stride across the two batteries 20 which are adjacent to each other in the vehicle anteroposterior direction. One end of the bus bar 23 is connected to a negative terminal of the battery 20 at a front side, while the other end is connected to a positive terminal of the battery 20 at a rear side, out of the batteries 20 adjacent to each other in the vehicle anteroposterior direction.

The bus bars 24 are disposed along the vehicle out of the batteries 20 adjacent to each other in the vehicle anteroposterior direction, in outer end parts of the battery case 50 in the vehicle width direction. Each of the bus bars 24 has a plate-like shape, and is disposed at a lower position than top ends of the two batteries 20. One end of the bus bar 24 is connected to a negative terminal of the battery 20 at the front side, while the other end is connected to a positive terminal of the battery 20 at the rear side, out of the batteries 20 adjacent to each other in the vehicle anteroposterior direction.

Since the two batteries 20 adjacent to each other are interconnected by the bus bars 23, 24, a plurality of the batteries 20 are connected in series, and thus, the battery pack 10 is formed as an assembly of the batteries 20.

An electric cable 55 for the front wheels and an electric cable 56 for the rear wheels are provided for the purpose of supplying an electric power of the battery pack 10 respectively to the front wheel driving motor 140 and the rear wheel driving motor 150.

The cables 55 and 56 respectively include positive side cables 55a, 56a and negative side cables 55b, 56b. The positive side cables 55a, 56a and negative side cables 55b, 56b are respectively connected to the positive terminal 57a and the negative terminal 57b of the battery pack 10. The positive terminal 57a and the negative terminal 57b of the battery pack 10 are disposed in a space S in a front end part of the battery tray 30. In this space S, there is provided no battery 20.

The electric cable 55 for the front wheels is arranged from the space S to a front side of the vehicle, through an opening 34 which is formed on a front end face of the battery tray 30.

Moreover, the electric cable 56 for the rear wheels is arranged from the space S to a rear side of the vehicle, through an opening 35 which is formed on a rear end face of the battery tray 30. The electric cable 56 for the rear wheels is provided above the batteries 20 in the center part of the battery case 50 in the vehicle width direction.

The positive side cable 56a and the negative side cable 56b of the electric cable 56 for the rear wheels which are arranged in the battery case 50 are respectively fixed to the battery holders 90 by means of fixing clips 58. In this embodiment, each of the cables 56a and 56b is fixed at three positions, but the number of the fixing positions is not limited to three.

The convex part 11 of the battery cover 40 is formed so as to protrude upward and so as to extend along the vehicle anteroposterior direction, in a center part of the battery cover 40 in the vehicle width direction. The electric cable 56 for the rear wheels is arranged in this convex part 11. Specific arrangement of the electric cable 56 for the rear wheels inside the convex part 11 will be described below.

The cooling unit 60 is installed in the space S of the battery tray 30.

The cooling unit 60 is provided with an evaporator 61, a duct 70 which is connected to the evaporator 61 at its one end, and a fan unit 80 which is connected to the other end of the duct 70.

Although not shown, an introducing passage for supplying a cooling medium, and a discharging passage for discharging the cooling medium which is evaporated inside the evaporator 61 are connected to the evaporator 61. These introducing passage and discharging passage are connected to an external compressor or the like, which is not shown.

An air flow passage 42 for supplying the air which is cooled by the evaporator 61 to the respective batteries 20 is connected to the fan unit 80.

The air flow passage 42 is provided above the batteries 20 along the vehicle anteroposterior direction, in the center part of the battery case 50 in the vehicle width direction.

Moreover, the air flow passage 42 is formed of resin material having insulating performance.

Figure 5:
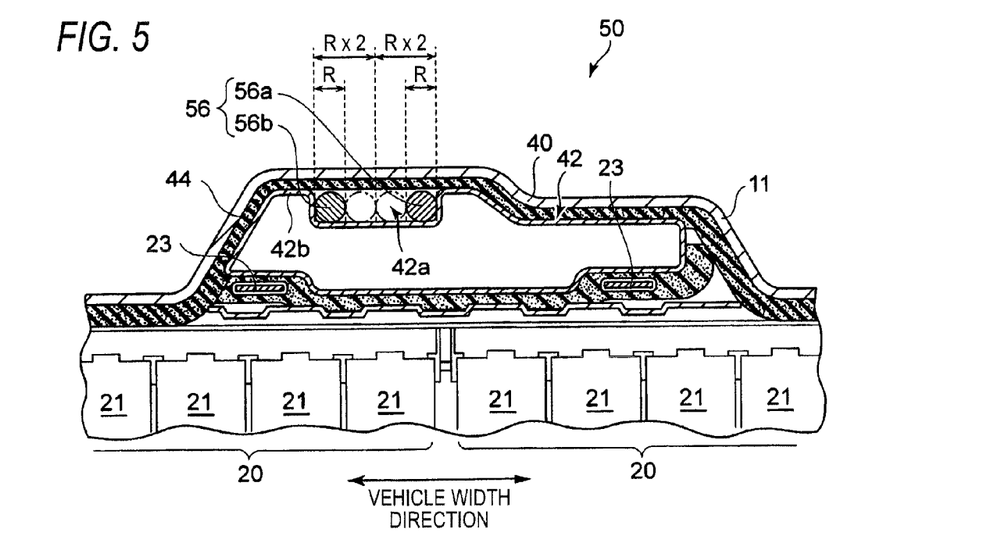
FIG. 5 is a sectional view of the battery pack in the first embodiment according to the invention showing a region surrounding a convex part.

FIG. 5 is a sectional view showing a region surrounding the convex part 11 of the battery pack 10 in the first embodiment according to the invention.

As shown in FIG. 5, the air flow passage 42 is provided in the convex part 11 of the battery cover 40. Inside the convex part 11, the air flow passage 42 is provided between the bus bars 23, which are disposed in the center part of the battery case 50 in the vehicle width direction, and the electric cable 56 for the rear wheels.

The air flow passage 42 has a concave part 42a, which is protruded downward and extends along the vehicle anteroposterior direction, on an upper face 42b of an upper wall of the air flow passage 42. The electric cable 56 for the rear wheels are arranged in this concave part 42a. The concave part 42a has such a width that the positive side cable 56a and the negative side cable 56b of the cable 56 for the rear wheels can be arranged in a snaky shape.

In this embodiment, as the width of the concave part 42a, a width twice as large as a diameter of the positive side cable 56a and the negative side cable 56b is secured for each of the cables 56a, 56b, so that the cables 56a, 56b can be respectively arranged in a snaky shape. Specifically, since the positive side cable 56a and the negative side cable 56b have the same diameter, the width of the concave part 42a is set to be four times as large as the diameter of the positive side cable 56a (the negative side cable 56b).

The electric cable 56 for the rear wheels is fixed to a predetermined position which has been set in advance according to a layout or so, using the fixing clips 58, after both ends of the cable 56 have been respectively connected to the terminals or so. In this case, by arranging the cable 56 in a snaky shape inside the concave part 42a, it is possible to absorb a superfluous length of the cable 56 for the rear wheels.

In this embodiment, as the width of the concave part 42a, the width twice as large as the diameter of the cables 56a, 56b is secured for each of the cables 56a, 56b. However, the width of the concave part 42a is not limited to this value, but may be larger than twice. By the way, in case where the width of the concave part 42a is made larger, a sectional area of the air flow passage 42 becomes smaller, which results in a smaller amount of the air flow. Therefore, the width of the concave part 42a may be determined in advance according to the layout or so, taking an amount of the air flow into consideration.

A pad 44 formed of elastic material is attached to an inner face of the battery cover 40. In this manner, it is possible to prevent abrasion of coverings of the positive side cable 56a and the negative side cable 56b, when the positive side cable 56a and the negative side cable 56b come into contact with the battery cover 40.

According to the battery pack 10 of the vehicle 100 in the above described embodiment, since the electric cable 56 for the rear wheels is arranged in a gap between the air flow passage 42, which is provided in the battery case 50, and the battery cover 40, it is possible to arrange the electric cable 56 for the rear wheels in a snaky shape in this gap. As the results, a superfluous length of the electric cable 56 for the rear wheels can be absorbed. In this manner, it is possible to prevent the electric cable 56 for the rear wheels from failing to be fixed to the position which has been set in advance, when the cable 56 is fixed with the fixing clips 58.

Moreover, since the electric cable 56 for the rear wheels is arranged between the air flow passage 42 formed of the resin material in the battery case 50 and the battery cover 40, the electric cable 56 for the rear wheels can be insulated from the batteries 20 and the bus bars 23, utilizing the space formed by the air flow passage 42. As the results, it is possible to prevent the electric cable 56 for the rear wheels from coming into contact with the batteries 20 due to deformation of the vehicle body, when an external force is exerted from a lateral side of the vehicle 100. In this manner, high insulating performance can be secured.

Further, since the electric cable 56 for the rear wheels is arranged between the air flow passage 42 and the battery cover 40, there is no necessity of providing a new space for arranging the electric cable 56 for the rear wheels, between the floor panel 111 and the battery case 50. Accordingly, the layout of the floor panel 111, the battery case 50 and so on need not be changed.

Moreover, since the concave part 42a for arranging the electric cable 56 for the rear wheels is formed, a sectional area of the air flow passage 42 to be decreased by providing the electric cable 56 for the rear wheels can be made as small as possible.

The concave part 42a has the width capable of absorbing a superfluous length of the electric cable 56 for the rear wheels, when the both ends of the electric cable 56 for the rear wheels are connected to the objects to be connected. Therefore, it is possible to arrange the electric cable 56 for the rear wheels in the concave part 42a, with an allowance. In this manner, the superfluous length of the electric cable 56 for the rear wheels can be reliably absorbed.

Moreover, since the air flow passage 42 and the electric cable 56 for the rear wheels are provided in the convex part 11 of the battery cover 40, a thickness of the battery case 50 in other region than the convex part 11 can be reduced. Further, since the convex part 11 of the battery cover 40 is positioned inside the floor tunnel 112, it is possible to reduce a length of the battery case 50 protruding downward from the floor panel 111.

Further, since the electric cable 56 for the rear wheels is pressed with the pad 44 against the air flow passage 42, fixing means for fixing the electric cable 56 for the rear wheel to the air flow passage 42 is not required. In this manner, a space for providing the fixing means is not required, and so, it is possible to secure a wide sectional area of the air flow passage 42.

Further, since the battery cover 40 is provided with the pad 44, it is possible to prevent abrasion of the covering of the electric cable 56 for the rear wheels, even though the electric cable 56 for the rear wheels flappers due to vibration of the vehicle 100. Still further, it is possible to prevent occurrence of frictional noise, when the electric cable 56 for the rear wheels flappers and comes into contact with the battery cover 40 and the air flow passage 42.

Second Embodiment

Then, a second embodiment of the invention will be described. In the following description, members in the second embodiment corresponding to those in the above described first embodiment will be denoted with the same reference numerals, omitting their description, and differences between the first embodiment and the second embodiment will be mainly described.

Figure 6:
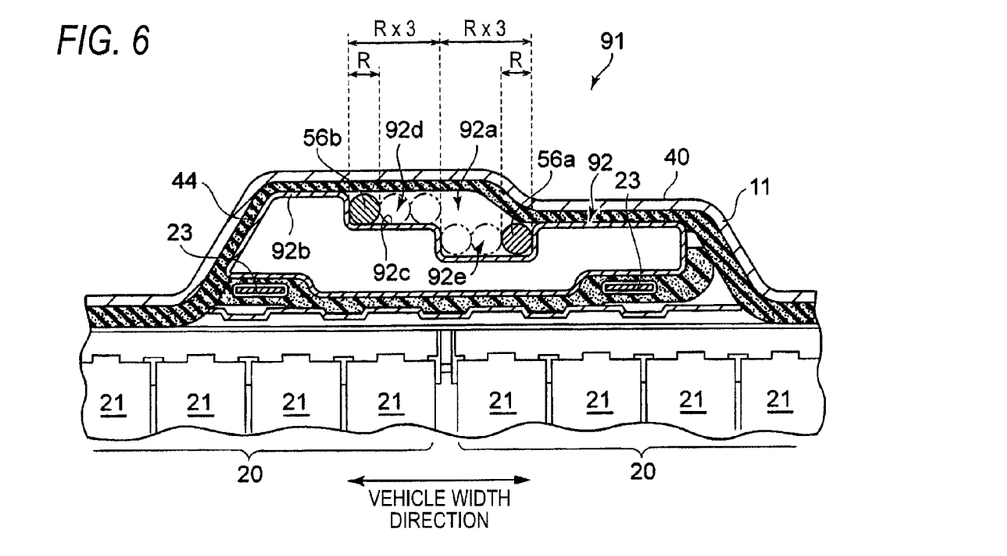
FIG. 6 is a sectional view of the battery pack in a second embodiment according to the invention showing a region surrounding a convex part.

FIG. 6 is a sectional view showing a region surrounding a convex part 11 of a battery pack 91 in the second embodiment according to the invention.

As shown in FIG. 6, an air flow passage 92 of the battery pack 91 is provided with a concave part 92a having recesses of different depths in two steps. Specifically, the concave part 92a has a first recess 92d which is formed on a bottom face 92c of the concave part 92a, and a second recess 92e which is further protruded downward than the bottom face 92c.

In this embodiment, the positive side cable 56a and the negative side cable 56b are respectively arranged in the second recess 92e and in the first recess 92d. In short, the positive side cable 56a and the negative side cable 56b are respectively arranged in the different recesses.

Although in this embodiment, the positive side cable 56a and the negative side cable 56b are respectively arranged in the second recess 92e and in the first recess 92d, the invention is not limited to this arrangement.

Moreover, in this embodiment, a width of the first recess 92d of the concave part 92a is set to be three times as large as the diameter of the negative side cable 56b, and a width of the second recess 92e of the concave part 92a is set to be three times as large as the diameter of the positive side cable 56a. The widths of the first recess 92d and the second recess 92e are determined in advance by layout or so, considering relation between the widths and an amount of the air flow.

Although in this embodiment, the width of the first recess 92d and the width of the second recess 92e are equal, but the widths are not limited to this. For example, the width of the first recess 92d may be set to be twice as large as the diameter of the negative side cable 56b, and the width of the second recess 92e may be set to be three times as large as the diameter of the positive side cable 56a. In this case, a space is formed above the positive side cable 56a which is arranged in the second recess 92e. By utilizing this space as a space for moving the negative side cables 56b which is arranged in the first recess 92d, it is possible to make the width of the first recess 92d smaller than the width of the second recess 92e. In this manner, it is possible to reduce the sectional area of the air flow passage 92 to be decreased by providing the concave part 92a in the air flow passage 92.

Of course, the width of the first recess 92d may be set to be three times as large as the diameter of the negative side cable 56b, and the width of the second recess 92e may be set to be twice as large as the diameter of the positive side cable 56a.

According to the battery pack 91 of the vehicle 100 in the above described embodiment, since the first recess 92d and the second recess 92e are provided in the concave part 92a, and the positive side cable 56a and the negative side cable 56b are respectively arranged in the second recess 92e and in the first recess 92d, it is possible to reliably arrange the cables 56a, 56b in a snaky shape. As the results, even in case where a plurality of the cables 56a, 56b are arranged in the concave part 92a, superfluous lengths of the cables 56a, 56b can be reliably absorbed.

In this embodiment too, substantially same advantages as in the first embodiment can be obtained.

According to an aspect of the invention, since the electric cable is arranged in a gap between the air flow passage which is provided in the battery case and the battery cover, it is possible to arrange the electric cable in a snaky shape in this gap. As the results, a superfluous length of the electric cable can be absorbed. In this manner, it is possible to prevent the electric cable from failing to be assembled to the battery case, because of displacement of the fixing clips, when the electric cable is arranged in the battery case of the battery pack.

Moreover, since the electric cable is arranged between the air flow passage and the battery cover, the electric cable can be insulated from the batteries, utilizing a space formed by the air flow passage. As the results, it is possible to prevent the electric cable from coming into contact with the batteries due to deformation of a vehicle body, when an external force is exerted from a lateral side of the vehicle. In this manner, high insulating performance can be secured.

Further, since the electric cable is arranged between the air flow passage and the battery cover, there is no necessity of providing a new space for arranging the electric cable between the battery case and a floor panel of the vehicle body to which the battery case is attached. Accordingly, a layout of the floor panel, the battery case and so on need not be changed.

According to an aspect of the invention, since the concave part for arranging the electric cable is formed, a sectional area of the air flow passage to be decreased by providing the electric cable can be made as small as possible.

According to an aspect of the invention, the concave part has the width capable of absorbing a superfluous length of the electric cable, when the both ends of the electric cable are respectively connected to the objects to be connected.

Therefore, it is possible to arrange the electric cable in the concave part, with an allowance, in a snaky shape. In this manner, the superfluous length of the electric cable can be reliably absorbed.

According to an aspect of the invention, the electric cable for supplying the electric power of the battery includes the positive side cable and the negative side cable. For this reason, at least two cables are arranged in the concave part. Since the recesses are formed in two steps in the concave part, and the positive side cable and the negative side cable are respectively arranged in the different recesses, it is possible to reliably arrange the cables in a snaky shape. As the results, even in case where a plurality of the cables are arranged in the concave part, superfluous lengths of the respective cables can be reliably absorbed.

According to an aspect of the invention, since the air flow passage and the electric cable are provided in the convex part of the battery cover, a thickness of the battery case in other region than the convex part can be reduced.

Moreover, since the convex part of the battery cover is positioned inside the floor tunnel, it is possible to reduce a length of the battery case protruding downward from the floor panel.

According to an aspect of the invention, since the electric cable is pressed with the elastic material against the air flow passage, fixing means for fixing the electric cable to the air flow passage is not required. In this manner, a space for providing the fixing means is not required, and so, it is possible to secure a wide sectional area of the air flow passage.

Moreover, since the battery cover is provided with the elastic material, it is possible to prevent abrasion of the covering of the electric cable, even though the electric cable flappers due to vibration of the vehicle. Still further, it is possible to prevent occurrence of frictional noise, when the electric cable flappers and comes into contact with the battery cover and the air flow passage.

Moreover, since the bus bars which are provided in the center part in the vehicle width direction are disposed between the lower face of the air flow passage and the upper face of the batteries, the bus bars can be insulated from the batteries, utilizing the space formed by the air flow passage. As the results, it is possible to prevent the electric cable from coming into contact with the bus bars due to deformation of the vehicle body, when an external force is exerted from the lateral side of the vehicle. In this manner, high insulating performance can be secured.

According to an aspect of the invention, it is possible to provide a battery pack of a vehicle which can stably support an electric cable, by absorbing a superfluous length of the electric cable.

The invention can be applied to a vehicle such as an electric vehicle or a hybrid vehicle which is equipped with a battery pack containing batteries for driving the vehicle.

What is claimed is:

1. A battery pack of a vehicle, the battery pack comprising:
    a battery;
    a battery case including: a battery tray which contains the battery; and a battery cover which is mounted on the battery tray and which covers the battery;
    a cooling unit provided in an end part of the battery case in a first direction that is a longitudinal direction of the battery case, and configured to supply a cooling air into the battery case;
    an air flow passage connected to the cooling unit and placed between the battery and the battery cover, the air flow passage being a member having an upper wall and a lower wall defining a passage, having a closed cross-section and extending in the first direction, that passes the cooling air therethrough without the cooling air making contact with the battery, the upper wall being provided with a concave part in a shape of a groove that extends in the first direction; and
    an electric cable placed inside a space defined by the groove and an inner surface of the batter cover.

2. The battery pack according to claim 1, wherein
    the concave part of the air flow passage has a width capable of absorbing a superfluous length of the electric cable when both ends of the electric cable are respectively connected to objects to be connected.

3. The battery pack according to claim 1, wherein
    the electric cable includes a positive side cable and a negative side cable,
    the concave part of the air flow passage includes two recesses which are different from each other in depth, and
    the positive side cable and the negative side cable are respectively arranged in the two recesses.

4. The battery pack according to claim 1, wherein
    a floor panel of the vehicle is provided with a floor tunnel which is protruded upward and which extends along a vehicle anteroposterior direction, in a center part of the floor panel in a vehicle width direction,
    the battery cover has a convex part which is protruded upward and which extends along the first direction, in the center part in the second direction, and
    the air flow passage and the electric cable are arranged in the convex part, and the convex part is provided inside the floor tunnel.

5. The battery pack according to claim 1, wherein
    an elastic material is provided between the electric cable and the battery cover, and
    the electric cable is pressed with the elastic material against the air flow passage.

6. The battery pack according to claim 1, wherein
    the battery includes a plurality of batteries, and
    bus bars for connecting the batteries include a bus bar which is disposed in the center part in the second direction and which is arranged between a lower face of the air flow passage and upper faces of the batteries.

7. The battery pack according to claim 1, wherein
    the concave part is a deformed part provided in the upper face of the upper wall of the air flow passage.

* * * * *